United States Patent [19]

Bozzuto

[11] 4,282,449
[45] Aug. 4, 1981

[54] COAL GASIFIER SUPPLYING MHD-STEAM POWER PLANT

[75] Inventor: Carl R. Bozzuto, Enfield, Conn.

[73] Assignee: Combustion Engineering, Inc., Windsor, Conn.

[21] Appl. No.: 63,234

[22] Filed: Aug. 3, 1979

[51] Int. Cl.³ .............................................. H02N 4/02
[52] U.S. Cl. .......................................... 310/11; 48/210
[58] Field of Search ....................... 48/210, 63, 64, 65, 48/77; 310/11

[56] References Cited

U.S. PATENT DOCUMENTS

| | | | |
|---|---|---|---|
| 3,531,664 | 9/1970 | Hals | 310/11 |
| 3,531,665 | 4/1970 | Rosa | 310/11 |
| 3,720,850 | 3/1973 | Way | 310/11 |
| 3,895,243 | 7/1975 | Amend et al. | 310/11 |
| 4,064,222 | 12/1977 | Bretz | 48/210 X |
| 4,099,929 | 7/1978 | Tippner | 48/210 X |
| 4,107,557 | 8/1978 | Shepherd | 310/11 |
| 4,123,502 | 10/1978 | Holter et al. | 48/210 X |
| 4,163,910 | 8/1979 | Matthews et al. | 310/11 |
| 4,200,815 | 4/1980 | Petrick et al. | 310/11 |

OTHER PUBLICATIONS

Hals et al., "Progress in Development of Auxiliary MHD Power Plant Components at Avco Everett Research Laboratory" 11/74, ASME, 74-WA/Ener-6.
Hals et al., "Development and Design Characteristics of Auxiliary MHD Power Plant Components," 11/73, ASME, 73-WA/Ener-10.

*Primary Examiner*—Donovan F. Duggan
*Attorney, Agent, or Firm*—William W. Habelt

[57] ABSTRACT

An atmospheric pressure coal gasifier is combined with a MHD generator and a vapor generator to provide an entirely coal-fueled power generating system. The combustible low BTU gas formed in the gasifier is passed through a gas cleaner wherein particulate atter, gaseous sulfur compounds, and char are removed to produce a clean combustible low BTU gas. A first portion of the clean combustible low BTU gas and the char are passed to the burner of the MHD generator as a source of fuel. A second portion of the clean combustible low BTU gas is passed to a direct-fired air heater as a source of fuel for preheating the combustion air supplied to the burner of the MHD generator.

7 Claims, 1 Drawing Figure

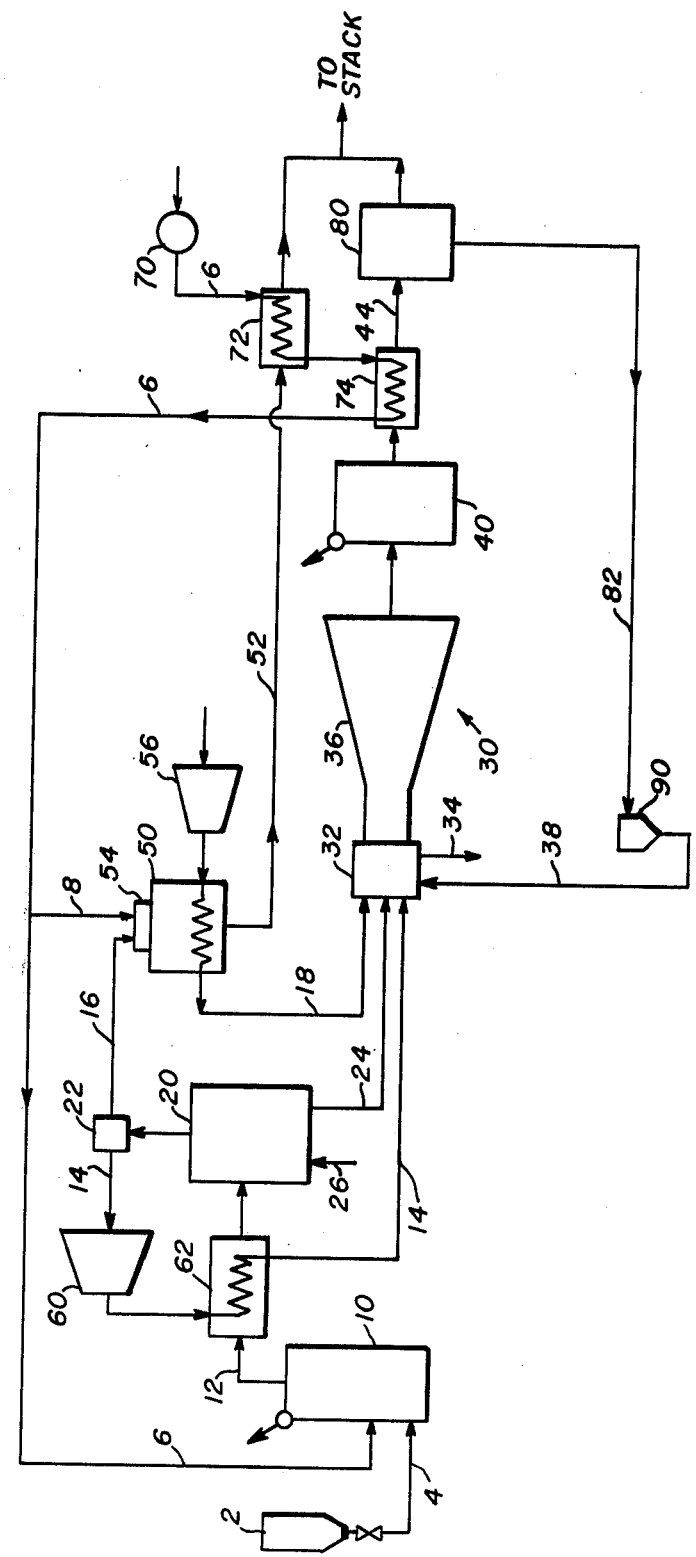

COAL GASIFIER SUPPLYING MHD-STEAM POWER PLANT

BACKGROUND OF THE INVENTION

The present invention relates to a method and apparatus for combining a magnetohydrodynamic generator and vapor generator to utilize the product gas and heat output of a coal gasifier to generate power. More specifically, the char and a first portion of the low BTU product gas produced in an atmospheric pressure coal gasifier are used to fuel a MHD burner, while a second portion of the low BTU product gas is used as an independent source of fuel to preheat combustion air for the MHD burner.

In a magnetohydrodynamic (MHD) generator, fuel and air are combusted to form a high temperature working fluid. The working fluid must be formed at a sufficiently high temperature, at least 4000 F., to promote ionization therein. The working fluid thus formed is passed through a static magnetic field at a high velocity thereby inducing direct current. Ergo, the MHD process provides for the direct conversion of energy into electricity without the need of a conventional turbine generator. When combined with a vapor generator disposed downstream of the MHD generator, wherein the waste heat contained in the gas products produced in the MHD burner is utilized to generate steam as an auxiliary source of power, overall efficiencies in the area of 50 percent can be obtained.

When integrating a MHD generator with a vapor generator, a number of problems have been encountered to which the present invention is addressed. First, present day technology dictates the use of an independently-fired air heater to provide high temperature, approximately 3000 F., combustion air to the MHD burner. Since the independently-fired air heater must utilize a clean fuel in order to prevent fouling and corrosion of heat transfer surface immersed therein, oil or gas is required. Coal, because of its high ash content, cannot serve directly as the fuel for an independently-fired air heater.

Second, economics require that the seed material introduced into the MHD burner to enhance the electrical conductivity of the working fluid discharged into the MHD channel must be reclaimed and recycled. Unfortunately, the high sulfur content of most coals proposed as fuel for the MHD burner results in sulfur contamination of the seed. Thus, expensive reprocessing of the reclaimed seed is required in order to remove the sulfur contamination.

Third, the temperature of the working fluid must be sufficiently high, i.e., in the range of 4000 to 5000 F., in order to insure ionization and proper electrical conductivity. Thus, it is preferred that the fuel fired in the MHD burner have a low moisture content and a low hydrogen content so that the amount of available energy lost to the latent heat of vaporization of water delivered to or formed in the combustion process is minimized.

SUMMARY OF THE INVENTION

The present invention provides a power generating system which is directed at solving or alleviating the aforementioned problems of the art. In the present invention, an atmospheric pressure coal gasifier is combined with a MHD generator and a vapor generator to provide an entirely coal-fueled power generating system.

An atmospheric pressure coal gasifier is provided which produces a combustible low BTU gas and a low sulfur char entrained therein. The combustible low BTU gas discharging from the gasifier passes through a gas cleaner wherein particulate matter, gaseous sulfur compounds, and unburned carbon, i.e., char, are removed thereby providing a clean combustible low BTU gas. A first portion of the clean combustible low BTU gas discharging from the gas cleaner is passed through a compressor to increase its pressure and then passed in heat exchange relationship with the hot dirty gas discharging from the gasifier so as to preheat it to approximately 1000 F. This first portion of clean combustible low BTU gas is then passed to the burner of a MHD generator as a source of fuel.

A second portion of the clean combustible low BTU gas discharging from the gas cleaner passes directly to the burner of a direct-fired air heater wherein the combustion air to be supplied to the MHD burner is preheated to a high temperature of approximately 3000 F.

The particulate matter and char removed from the product gas of the gasifier in the gas cleaner is conveyed to the burner of the MHD generator wherein it is combusted with the first portion of clean combustible low BTU gas and high temperature combustion air to form the working fluid of the MHD generator. The char formed during the gasification process is an excellent fuel for the MHD burner not only because it has been purged of a large amount of its sulfur content during the gasification process, but also because much of the moisture and hydrogen present in the parent coal has been driven off with the volatiles during the coal gasification process resulting in a char which has a low moisture and hydrogen content. Similarly, because the low BTU gas has been cleaned of sulfur compounds; the low BTU gas makes an ideal clean fuel to augment the heat content of the char. As a result, the working fluid produced in the MHD burner from combustion of the char and the clean low BTU gas is relatively low in sulfur pollutants.

The hot working fluid produced in the MHD burner discharges therefrom through a MHD channel into a vapor generator. As the working fluid passes through the MHD channel, direct current is generated in the conventional well-known manner. Similarly, as the hot working fluid discharging from the MHD channel passes over the heat transfer surface provided in the vapor generator, a vapor, such as steam, is generated and subsequently passed through a turbine to generate additional power. In this manner, an overall system efficiency in the neighborhood of 50 percent is attainable from an entirely coal-fired system.

BRIEF DESCRIPTION OF THE DRAWING

The FIGURE is a flow diagram of the fluids flowing between and through the components of a power generating system as contemplated in the present invention.

DESCRIPTION OF THE PREFERRED EMBODIMENT

In the present invention, an atmospheric pressure coal gasifier 10 is disposed in series with a gas cleaner 20, a MHD generator 30, and a vapor generator 40 to provide an entirely coal-fueled power plant with an overall conversion efficiency in the neighborhood of 50 percent. The coal gasifier 10 in combination with the gas cleaner 20 not only provides a supply of clean combustible low BTU gas and low sulfur char as fuel for the burner 32 of the MHD generator 30, but also provides a source of clean combustible low BTU gas as fuel for a direct-fired air heater 50 wherein the combustion air being supplied to the MHD burner 32 is preheated. In the burner 32, the low sulfur char and clean combustible low BTU gas produced in the coal gasifier 10 is combusted in the air preheated in air heater 50 to produce a high temperature working gas. This high temperature working gas discharges from the MHD burner 32 through a static magnetic field established in a MHD generation channel 36, thereby directly producing electric power, and thence through a vapor generator 40 in heat exchange relationship therein with a liquid such as water so as to produce a vapor such as steam. The vapor produced in the vapor generator is passed through a turbine, not shown, to produce additional electric power.

The FIGURE presents an overview of the preferred embodiment of the invention in schematic form. Pulverized coal is fed to the coal gasifier 10 from a coal storage silo 2 through line 4. Preheated air is supplied to the gasifier through air conduit 6. This air is preheated, as will be described further hereinafter, by passing the air through air heaters disposed both in the flue 52 of the direct-fired air heater 50 and the flue 44 of the vapor generator 40.

The gasifier 10 is an atmospheric pressure, entrainment-type gasifier in which pulverized coal and preheated air are reacted in either one- or two-stage firing to form a combustible low BTU gas and unburned, devolatilized coal, termed char. Although an entrainment-type gasifier is preferred, other well-known types of gasifiers capable of operating at atmospheric pressure such as a fixed bed or a fluidized bed gasifier may be substituted. During the gasification process, the coal supplied to the gasifier is devolatilized and partially combusted in an atmosphere somewhat deficient in the amount of oxygen required to completely combust the coal thereby forming a combustible low BTU gas having a heating value of about 140 BTU's per standard cubic foot and a solid carbon residue of char. Much of the sulfur contained in the parent coal supplied to the gasifier is converted during the process to hydrogen sulfide, a gas potentially very corrosive to metal tubes such as those of a heat exchanger. Additionally, much of the moisture and hydrogen content of the parent coal is similarly driven out of the coal during the gasification process. Therefore, the resultant char is a low sulfur, low moisture, low hydrogen solid fuel ideally suitable for combustion in a MHD burner.

The gas produced in the gasifier 10 passes therefrom through a first gas pass 12 to a gas cleaner 20 wherein gaseous sulfur compounds, such as hydrogen sulfide, particulate matter and char are removed by means of any one of several well-known processes. A typical gas cleaner would consist of a spray dryer, a cyclone, and a wet scrubber for particulate removal and a Stretford system for hydrogen sulfide removal.

The clean combustible low BTU gas leaving the gas cleaner 20 is selectively split by suitable splitting means 22 into a first and a second portion. The first portion of the clean combustible low BTU gas passes through a second gas pass 14 to the burner 32 of the magnetohydrodynamic generator 30 for subsequent combustion therein. Disposed in the second gas pass 14 immediately downstream with respect to gas flow of the splitting means 22 is a compressor 60 for increasing the gas pressure of the first portion of the clean combustible low BTU gas to a level of 3 to 20 atmospheres thereby enhancing the suitability of the low BTU gas as a fuel for a MHD burner. The second gas pass 14 is operatively associated with the first gas pass 12 so as to direct the first portion of clean combustible low BTU gas in heat exchange relationship with the hot gas discharging through the first gas pass 12 from the coal gasifier 10 on its journey to the gas cleaner 20. In passing through the gas-to-gas heat exchanger 62, the hot combustible gas passing through the first gas pass 12 is cooled from about 1700 F. to 300 F. while the first portion of clean combustible low BTU gas passing through the second gas pass 14 on its way to the MHD burner 32 is heated to at least 1000 F. It is necessary to preheat the low BTU gas to be used as a fuel in the MHD burner in order to insure that flame temperatures are above the ionization point of the combustion gases formed in the MHD burner.

As mentioned previously, hydrogen sulfide can be very corrosive to metals and in particular to the hot tubes of a heat exchanger. The gas-to-gas heat exchanger 62 is immersed in the hot low BTU gas discharging from the gasifier through the first gas pass 12. Thus, the tubes of heat exchanger 62 are exposed to the hydrogen sulfide contained in the product gas of the gasifier 10. For this reason, an atmospheric gasifier is required. Experience has shown that heat exchangers immersed in the product gas of a high pressure gasifier experience severe $H_2S$ corrosion which is attributable to the high partial pressures of $H_2S$ in the gas stream. By utilizing an atmospheric gasifier, the partial pressure of $H_2S$ in the hot gas discharging from the gasifier 10 is much lower than that encountered in a pressurized gasifier. Therefore, the potential for corrosion of the heat exchange tubes in the heat exchanger 62 is greatly reduced.

The char and other particulate matter removed from the combustible low BTU gas in the gas cleaner 20 is conveyed from the gas cleaner 20 via means 24 to the MHD burner 32 of the MHD generator 30. Since the char has a low sulfur, low moisture and low hydrogen content, it is an excellent fuel for a MHD burner as it will readily produce a high temperature upon combustion. Because the char is fired in the MHD burner in conjunction with a low BTU gas, the low BTU gas need only be preheated to at least 1000 F prior to combustion. If the low BTU gas were burned alone in the MHD burner in the absence of the char, the low BTU gas would have to be preheated to a much higher temperature in order to insure that flame temperatures above the ionization point could be produced in the MHD burner. The sulfur removed from the low BTU gas and gas cleaner 20 leaves the cleaner through line 26 as a by-product of the system which may be sold or further processed for other uses.

The second portion of the clean combustible low BTU gas leaving splitter means 22 passes through a third gas pass 16 to the burner 54 of the direct-fired air heater 50. The second portion of clean low BTU gas is combusted in the direct-fired air heater 50 with preheated combustion air supplied through air conduit 8 to form hot combustion products. Ambient air is compressed in compressor 56 to a pressure of 3 to 20 atmospheres and passed through conduit 18 through the indirect-fired air heater 50 in heat exchange relationship with the hot combustion products and thereby preheated to a temperature of approximately 3000 F. The hot combustion air then continues through air conduit 18 to the MHD burner 32. The hot combustion products formed in the direct-fired air heater 50 are vented to the stack through flue 52.

The first portion of the clean low BTU gas and the low sulfur, low hydrogen, low moisture char are combusted in the MHD burner 32 with the hot combustion air from the direct-fired air heater 50 to form a high temperature working gas having a temperature in the range of 4 to 5000 F. Such a high temperature is required in order to ionize the working gas so that electrical power may be generated directly therefrom as the working gas discharges from the MHD burner 32 through the MHD generation channel 36. In order to further increase the conductivity of the working gas produced in the MHD burner 32, seed material such as potassium sulfate and potassium carbonate is injected into the MHD burner through seed feed line 38. Because of the high temperature present during the combustion process within the MHD burner 32, the seed material is readily vaporized and ionized. Also because of the high combustion temperatures present, 80 to 90 percent of the mineral matter present in the char and particulate matter supplied to the MHD burner from the gas cleaner 20 through means 24 is melted and removed from the MHD burner 32 as a molten slag through slag tap line 34 and directed to a quench tank, not shown.

The working gas cools as it passes through the MHD generation channel 36 and discharges to the vapor generator 40 at a temperature in the neighborhood of 3600 F. The vapor generator 40 provides heat transfer surface, not shown, whereby heat is transferred from the working fluid to a liquid such as water flowing through the heat transfer surface to generate a vapor such as steam as an additional source of power. The vapor generated in vapor generator 40 is collected and passed through a conventional turbine cycle to produce additional electric power in the well-known manner. The working fluid then leaves vapor generator 40 and is vented to the stack through flue 44.

In the preferred embodiment, the combustion air supplied to the gasifier 10 and to the direct-fired air heater 50 is preheated to approximately 1100 F. by utilizing the heat contained in the combustion products produced in the direct-fired air heater 50 and the working gas produced in the MHD burner 32. As illustrated, a fan 70 forces ambient air via an air conduit 6 through a first air preheater 72 disposed in the flue 52 of the direct-fired air heater 50 and thence through a second air heater 74 disposed in the flue 44 of the vapor generator 40. The preheated combustion air leaving the second air heater 74 is split into a first and a second stream. The first stream proceeds by air conduit 6 to the coal gasifier 10 and the second stream by air conduit 8 through the burner 54 of the direct-fired air heater 50.

In order to reduce seed costs, it is preferred that a particulate collector 80 be disposed in the flue 44 of the vapor generator 40 to recover the seed injected into the MHD burner 32 to increase the conductivity of the working gas. As the fuel fired in the MHD burner is low sulfur because the sulfur compounds were driven out of the coal during the gasification process in the coal gasifier 10 and subsequently removed from the low BTU gas stream in the gas cleaner 20, seed reprocessing will not be required. That is, the seed recovered in particulate collector 80 can be directly recycled through line 38 to the MHD burner 32 of the MHD generator 30.

From the foregoing, it will be seen that this invention provides a combined MHD and steam power plant which is entirely coal fired, is low in emissions, eliminates the need for seed reprocessing and attains a relatively high overall conversion efficiency.

As many possible embodiments may be made of this invention without departing from the scope thereof, it is to be understood that the preferred embodiment of the invention described herein is merely illustrative and is not to be interpretated in a limiting sense.

What is claimed is:

1. A system for generating power from the combustion of coal and air comprising:
   (a) a magnetohydrodynamic generator having a burner for producing a high temperature working gas and a generation channel for directly generating electric power from the high temperature working gas, the generation channel connected to the burner so as to receive the high temperature working gas;
   (b) an atmospheric coal gasifier for producing a combustible low BTU gas, a first portion of which is to be combusted in the burner of said magnetohydrodynamic burner;
   (c) a source of coal connected to said gasifier;
   (d) means for supplying preheated combustion air to said coal gasifier;
   (e) a gas cleaner disposed downstream with respect to gas flow of said coal gasifier for removing particulate matter, gaseous sulfur compounds, and unburned carbon from the combustible low BTU gas produced in said gasifier;
   (f) a first gas pass connected between said coal gasifier and said gas cleaner thereby providing a gas path for conveying the combustible low BTU gas discharging from said gasifier to said gas cleaner;
   (g) means interconnected between said gas cleaner and the burner of said magnetohydrodynamic generator for conveying the unburned carbon and particulate matter removed from the combustible low BTU gas in said gas cleaner to the burner of said magnetohydrodynamic generator for combustion therein;
   (h) means operatively associated with said gas cleaner for selectively splitting the clean combustible low BTU gas discharging therefrom into a first and a second portion;
   (i) a second gas pass connected between said splitting means and the burner of said magnetohydrodynamic generator thereby providing a gas path for conveying the first portion of the clean combustible low BTU gas discharging from said splitting means to the burner of said magnetohydrodynamic generator to be combusted therein, said second gas pass being operatively associated with said first pass so as to direct the first portion of clean combustible low BTU gas in heat exchange relationship with the gas discharging from said gasifier;
   (j) a compressor disposed in said second gas pass for increasing the gas pressure of the first portion of the clean combustible low BTU gas discharging from said splitting means;
   (k) a direct-fired air heater having a burner wherein the second portion of the clean combustible low BTU gas is combusted to preheat high temperature combustion air to be supplied to the burner of said magnetohydrodynamic generator, and a flue for venting the combustion products formed therein to the atmosphere;

(l) a third gas pass connected between said splitting means and the burner of said direct-fired air heater thereby providing a gas path for conveying the second portion of said clean combustible low BTU gas discharging from said splitting means to the burner of said direct-fired air heater; and (m) a vapor generator connected to the generation channel of said magnetohydrodynamic generator so as to receive the high temperature working gas passing out of the generation channel, said vapor generator having heat transfer surface whereby heat is transferred from the high temperature working gas to a liquid to generate a vapor as a source of power, and a flue for venting the working gas passing therethrough to the atmosphere.

2. A system as recited in claim 1 further comprising:

(a) means operatively associated with said magnetohydrodynamic generator for supplying seed material to the working gas from in the burner of said magnetohydrodynamic generator, thereby enhancing the conductivity of the working gas passing through the generation channel of said magnetohydrodynamic generator;

(b) a particulate collector disposed in the flue of said vapor generator for removing the seed material entrained in the working gas passing therethrough; and (c) means interconnected between said particulate collector and said seed material supply means for recycling the seed material removed from the working gas.

3. A system as recited in claim 2 wherein the means for supplying preheated combustion air to said coal gasifier comprises:

(a) a first air heater disposed in the flue of said direct-fired air heater;

(b) a second air heater disposed in the flue of said vapor generator;

(c) means for conveying air through said first air heater in heat exchange relationship with the combustion products passing through the flue of said direct-fired air heater and thence through said second air heater in heat exchange relationship with the working gas passing through the flue of said vapor generator; and (d) an air conduit connected between said second air heater and said coal gasifier, thereby providing a flow path for supplying the preheated air to said coal gasifier.

4. The system as recited in claim 3 wherein the vapor generator is a steam generator.

5. The system as recited in claim 4 wherein the atmospheric gasifier has a gasification chamber formed of heat exchange tubes through which water is circulated so as to absorb a portion of the heat generated during the gasification process thereby generating steam as a source of power.

6. A method of generating power from the combustion of coal and air, comprising the steps of:

(a) gasifying coal in an oxygen deficient environment at approximately atmospheric pressure so as to produce a combustible low BTU gas;

(b) removing particulate matter, gaseous sulfur compounds, and unburned carbon from the combustible low BTU gas produced by gasifying coal so as to provide a clean combustible low BTU gas;

(c) selectively splitting the clean combustible low BTU gas into a first and a second portion;

(d) increasing the gas pressure of the first portion of the clean combustible low BTU gas to a value of 3 to 20 atmospheres;

(e) passing the pressurized first portion of the clean combustible low BTU gas in heat exchange relationship with the uncleaned combustible low BTU gas so as to preheat the pressurized first portion of the clean combustible low BTU gas to a temperature of at least 1000 F.;

(f) combusting the second portion of the clean combustible low BTU gas so as to preheat a supply of compressed air to a temperature of approximately 3000 F.;

(g) combusting the preheated pressurized first portion of the clean combustible low BTU gas and the unburned carbon removed from the combustible low BTU gas with the preheated compressed air to produce a working gas having a high temperature of approximately 4000 to 5000 F.;

(h) passing the high temperature working gas thru a static magnetic field thereby directly generating power; and (i) passing the working gas discharging from the static magnetic field in heat exchange relationship with a liquid so as to produce a vapor as a source for generating power.

7. A method as recited in claim 6, further comprising the steps of:

(a) injecting seed material into the high temperature working gas prior to passing the working gas through a static magnetic field, thereby enhancing the conductivity of the working gas;

(b) removing the seed material from the working gas after the working gas has passed through the static magnetic field; and (c) recycling the seed material removed from the working gas.

* * * * *

UNITED STATES PATENT AND TRADEMARK OFFICE
CERTIFICATE OF CORRECTION

PATENT NO. : 4,282,449

DATED : August 4, 1981

INVENTOR(S) : Carl R. Bozzuto

It is certified that error appears in the above—identified patent and that said Letters Patent is hereby corrected as shown below:

On the Title page:

Abstract, line 5  change "atter" to --matter--

Signed and Sealed this

Twenty-ninth Day of June 1982

[SEAL]

Attest:

GERALD J. MOSSINGHOFF

*Attesting Officer*   *Commissioner of Patents and Trademarks*